N. Downes,
Water Cooler,

Nº 84,482. Patented Dec. 1, 1868

WITNESSES:
M. D. McCanna
F. A. Morley

INVENTOR:
Nicholas Downes

NICHOLAS DOWNES, OF SYRACUSE, NEW YORK.

Letters Patent No. 84,482, dated December 1, 1868.

IMPROVEMENT IN FILTERS AND COOLERS.

The Schedule referred to in these Letters Patent and making part of the same.

*To all whom it may concern:*

Be it known that I, NICHOLAS DOWNES, of Syracuse, in the county of Onondaga, and State of New York, have invented a new and improved Water-Filter and Cooler; and I do hereby declare that the following is a full, clear, and exact description thereof, which will enable those skilled in the art to make and use the same, reference being had to the accompanying drawings, forming part of this specification, in which—

Similar letters of reference indicate like parts in all the figures.

This invention relates to new and useful improvement in water-filters and cooler, whereby a very simple and efficient apparatus is obtained; and It consists principally in so constructing and arranging the ice-chamber that it will be surrounded by the filtered water which is cooled by the contact, as hereinafter explained.

In the accompanying drawings—

A is the shell or main vessel, which is of a plain cylindrical form.

Figure 1:
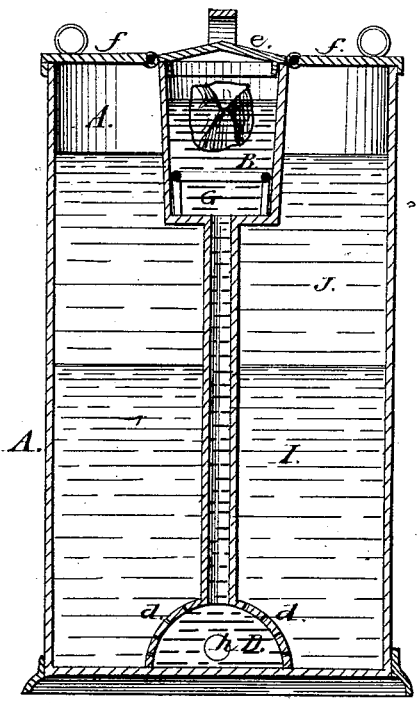
Figure 1 is a vertical section, taken in the line $x\ x$ in fig. 3.
Figure 2:
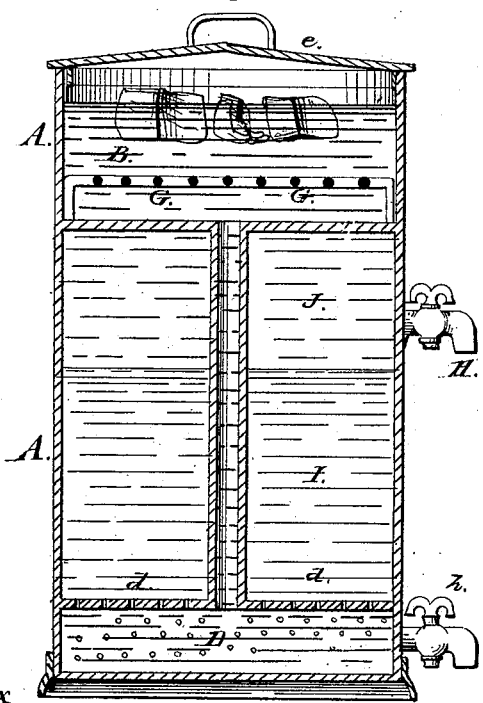
Figure 2 is a vertical section, taken in the line $y\ y$ in fig. 3.
Figure 3:
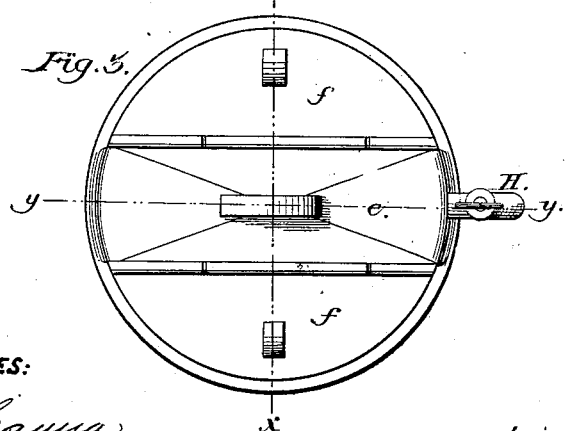
Figure 3 is a plan view.

At its top end is an oblong tank, B, which extends across the chamber of the main vessel in one direction, as shown in fig. 2, but only partially fills vessel A, laterally, as shown in fig. 1, so that access is had to the main vessel upon either side of tank B.

A pipe, C, connects the bottom of tank B with a chamber, D, at the bottom of the vessel, which is formed by an arching piece of perforated sheet-metal, $d\ d$. This chamber is of an oblong form, and does not cover the entire bottom of vessel A, as shown in cross-section of it, fig. 1, but in its longest direction it extends to the shell A, so that the cock $h$ may communicate with it readily.

The tank B has a cover, $e$, and the main vessel has two covers, $f\ f$, which are hinged to opposite sides of the tank.

G is an ice-rack within tank B.

H is a cock for taking filtered water from the main vessel, and $h$ is a cock for reversing the filter for cleaning.

The red lines I represent the filtering-medium;

J, the filtered water, and

K, the unfiltered water.

Its action is as follows:

The unfiltered water and ice are placed in tank B, and the water passing down through pipe C into chamber D, then filters upward, through the filtering-medium I, into chamber J, where it is ready for withdrawal by cock H.

The water standing in J is in contact with the sides of the ice-and-water tank B, and is cooled thereby, and as the ice in the tank B melts its water is filtered also.

The walls of that portion of the vessel A which holds the filtered water may be lined with wood or other non-conductor of heat, or that part of its walls may be made double, to prevent radiation of heat between the water J and the air outside of the vessel. However, for ordinary use these additions will not be used.

The filtering is done wholly upward, and the filter is very readily cleaned, as, by opening cock $h$ and allowing it to empty through this cock, the filter is reversed and cleaned with the greatest facility.

By this means I obtain a filter which is constructed in a simple and inexpensive manner, and which is convenient and efficient in its action.

I am aware that it is not new to combine a filter with a water-cooler; therefore I do not wish to claim such combination. Neither do I claim the combination of the several parts composing the filter and cooler; but having thus described my invention,

What I claim as new, and desire to secure by Letters Patent, is—

As an improved article of manufacture, the combined water-cooler and filter, consisting of the ice-chamber B, with the rack G and separate cover $e$, the perforated chamber D, connected with the chamber B by pipe C, and having an outlet, $h$, and the casing A, having covers $f\ f$ and cock H, when said parts are all constructed and arranged to operate as herein shown and described.

NICHOLAS DOWNES.

Witnesses:
M. D. McCANNA,
F. A. MORLEY.